Aug. 27, 1957  E. E. HOOD  2,803,976
TWO SPEED COASTER BRAKE FOR VELOCIPEDES
Filed Aug. 2, 1954  2 Sheets-Sheet 1

INVENTOR.
Edwin Elliott Hood
BY
ATTORNEY

WITNESS:

Aug. 27, 1957     E. E. HOOD     2,803,976
TWO SPEED COASTER BRAKE FOR VELOCIPEDES
Filed Aug. 2, 1954     2 Sheets-Sheet 2

INVENTOR.
Edwin Elliott Hood
BY Clinton S. James
ATTORNEY

WITNESS:
Esther M. Stockton

United States Patent Office 2,803,976
Patented Aug. 27, 1957

2,803,976

TWO SPEED COASTER BRAKE FOR VELOCIPEDES

Edwin Elliott Hood, Elmira, N. Y., assignor to Bendix Aviation Corporation, Elmira Heights, N. Y., a corporation of Delaware Application August 2, 1954, Serial No. 447,166

8 Claims. (Cl. 74—750)

The present invention relates to a two-speed coaster brake for velocipedes and more particularly to a unit of this character in which the gearing is shifted from high to low and vice versa by manipulation of the driving pedals, without extraneous devices of any kind.

It is an object of the present invention to provide a novel velocipede gear and brake which is efficient and reliable in operation, and simple and rugged in construction.

It is another object to provide such a device in which the selection of the operative gear ratio is convenient and reliable.

It is another object to provide such a device in which the brake is always actuated with the mechanical advantage of the low gear ratio, irrespective of which drive ratio was previously used for propulsion.

Further objects and advantages will be apparent from the following description taken in connection with the accompanying drawing in which.

In the embodiment of the invention here disclosed, it is intended that the device will be normally operated by a direct driving connection from the driving sprocket to the wheel hub, whereas the low gear ration is intended as an under drive or "hill climb" gear. This arrangement however could obviously be reversed so that as a matter of convenience the terms "high gear" and "low gear" will be used throughout the specification although in this instance the high gear is in fact a direct drive. Likewise, in order to avoid unnecessary limitation, the driving clutches will be referred to in some of the claims as "primary" and "secondary" rather than as "low speed" and "high speed" clutches.

Figure 1:
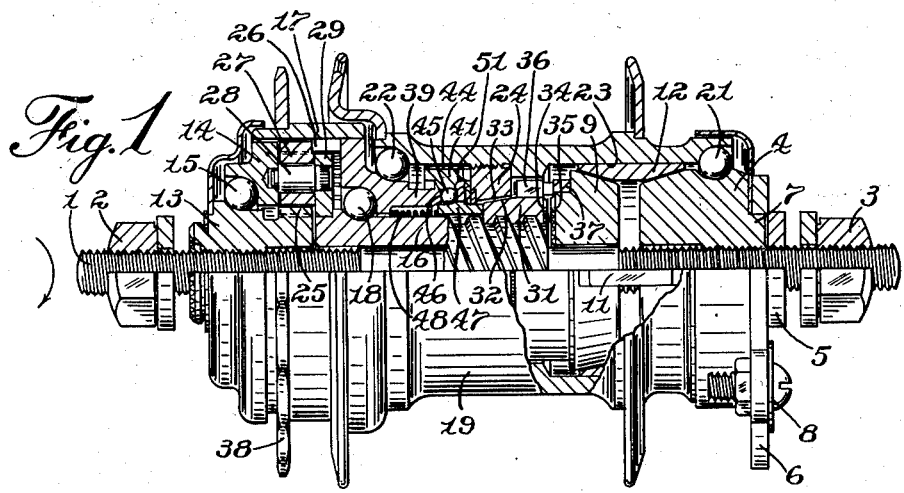
Fig. 1 is a side elevation partly broken away and in section of a preferred embodiment of the invention, showing the parts in the positions assumed when the device is in normal or high gear operation.

In Fig. 1 of the drawing there is illustrated an axle 1 adapted to be rigidly mounted in the frame of a vehicle such as a bicycle, by means of clamp nuts 2 and 3. A brake expander and anchor member 4 is threaded on the axle 1 and maintained in adjusted position by a lock nut 5 which also serves to clamp thereon an anchor arm 6 which is seated on a non-circular projection 7 of the anchor member and provided with a clamp 8 for attachment to the frame of the vehicle.

A movable expander member 9 is slidably mounted on the axle 1 and is non-rotatably connected to the anchor member 4 by means of rectangular keys 11. Arcuate brake shoes 12 are seated on the expander members 4, 9 and are moved radially outward when the member 9 is moved toward the member 4.

A bearing member 13 is adjustably threaded on the axle 1, and rotatably supports a ring member 14 by means of bearing 15. A screw shaft 16 is journaled on the axle between the bearing member 13 and movable expander member 9, and rotatably supports a driving member 17 by means of bearing 18. A hub member 19 is rotatably supported at its ends on bearings 21 and 22 which are seated on the anchor member 4 and driving member 17 respectively. The hub has a cylindrical interior surface 23 adapted to be engaged by the brake shoes 12, and also has a driven clutch ring 24 fixedly mounted therein.

The bearing member 13 has pinion teeth formed thereon to provide a sun gear 25. The driving member 17 has teeth formed in the interior thereof to provide an orbit gear 26, and a plurality of planet pinions 27, meshing with the sun gear and orbit gear, are rotatably mounted on bearing studs 28 piloted in openings in the ring member 14 and rigidly mounted on a planet carrier 29 fixedly positioned on the screw shaft 16. A low speed or primary driving clutch member 31 is threaded on the screw shaft and is formed with a tapered portion 32 adapted to frictionally engage in a corresponding interior tapered surface 33 in the driven clutch member 24 when the screw shaft is rotated in a forward direction. Clutch member 31 is also formed with teeth 34 adapted to engage similar teeth 35 on the movable expander member 9 when the screw shaft 16 is rotated backward. Means for ensuring traversal of the driving clutch member 31 by rotation of the screw shaft 16 is provided in the form of a retarder spring ring 36 having outturned ends which engage in a slot in a ring member 37 fixedly mounted on the expander member 9.

The driving member 17 has a sprocket 38 fixedly mounted adjacent one end in any suitable manner as by brazing, and its opposite end is formed as a threaded sleeve 39 of reduced diameter on which a secondary or high-speed driving clutch member 41 is threaded, such thread being preferably of substantially higher pitch than the screw shaft 16. For convenience in manufacture, the threaded sleeve 39 is preferably made as a separate piece, as illustrated, the parts of the driving member 17 being integrated in any suitable manner as by a pressed fit and/or brazing. Since applicant's prior Patent 2,410,785 issued November 5, 1946, shows and describes a similar composite driving member 6 with screw threaded extension 26 joined at 27, no novelty in the present case is predicated on this element per se, so that further description thereof is deemed unnecessary. High speed clutch member 41 is formed with teeth 42 adapted to engage similar teeth 43 formed on the driven clutch member 24 when the driving member is rotated in a forward direction. In order to ensure such traversal, a spring drag ring 44 is fixedly mounted on said driving clutch member 41 and is formed with arms which spring out into light frictional engagement with the interior of the hub 19 in the same manner as the arms 34 on the similar drag ring 33 shown and described in applicant's prior patent supra.

It will be noted that since the two driving clutch members must move in opposite directions to come into engagement with the driven clutch member 24, the screw shaft 16 and sleeve 39 are oppositely threaded. As here shown, the forward direction of rotation is indicated by the arrow in Fig. 1, so that the screw shaft 16 is formed with a right hand thread, and the sleeve 39 with a left hand thread.

Figure 3:
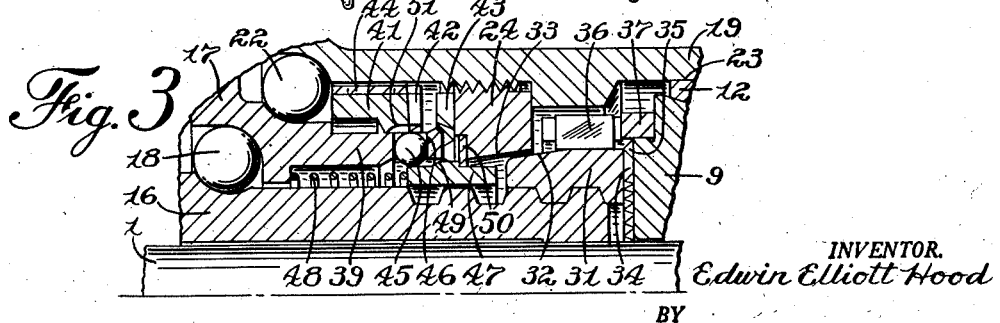
Fig. 3 is an enlarged detail showing the positions of the clutching parts during the application of the brake.
Figure 4:
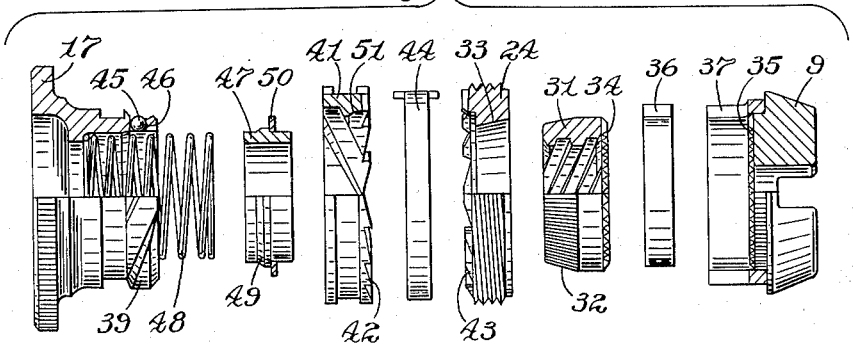
Fig. 4 is an exploded detail view partly in side elevation and partly in section of the high speed and low speed clutching elements and associated parts.
Figure 5:
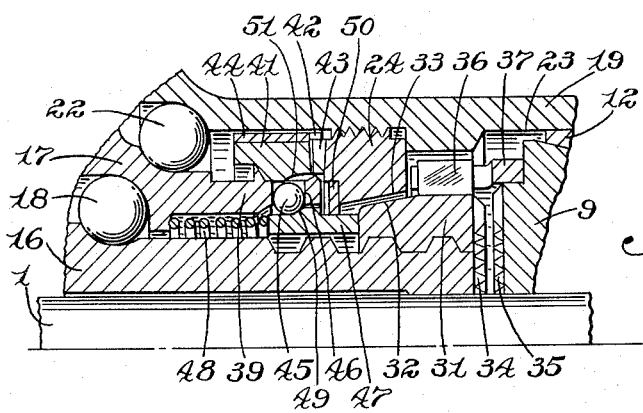
Fig. 5 is an enlarged sectional detail similar to Fig. 3 showing the positions of the parts when the hub is in high gear.
Figure 6:
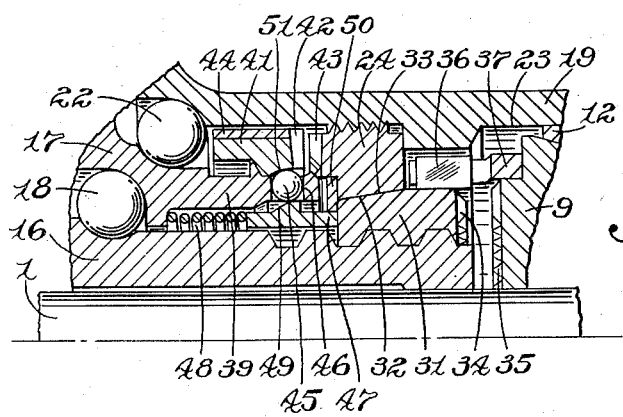
Fig. 6 is a view similar to Fig. 5 showing the parts in low gear position.

Means are provided for enabling the operator to selectively engage either the high-speed driving clutch member 41 or the low-speed driving clutch member 31 with the driven clutch member 24 by suitable manipulation of the driving member 17, and for locking the other driving clutch member out of engagement until such time as it is desired to change the driving gear ratio. For this purpose, a latch member in the form of a ball 45 is movably mounted in a radial passage 46 in the sleeve 39 (Fig. 3), and a collar 47 journaled on the screw shaft 16 is yieldably urged toward the low-speed driving clutch member 31 by means of a spring 48. Collar 47 has a cam rib 49 formed thereon in position to engage the ball 45 and force it radially outward when the low-speed driving clutch member 31 is moved into engagement with the driven clutch member 24 as shown in Fig. 6. Movement of the collar by spring 48 is preferably limited by means of a thrust washer 50 mounted on the collar adjacent the rib 49, and adapted to be received by a counterbore in the driven clutch member 24. The interior of the high-speed driving clutch member 41 is provided with an interior cam rib 51 which is arranged to similarly engage the ball 45 and force it inward when the high-speed driving clutch member engages the driven clutch member 24 as shown in Fig. 5. It will thus be seen that when either of the driving clutch members 31 or 41 is in operative position, the other driving clutch member is held out of contact with the driven clutch member 24 by the engagement of the ball 45 with its cam rib. It will be understood that if deemed desirable, a plurality of latches 45 may be employed, equally spaced about the axis of the driving member.

Figure 2:
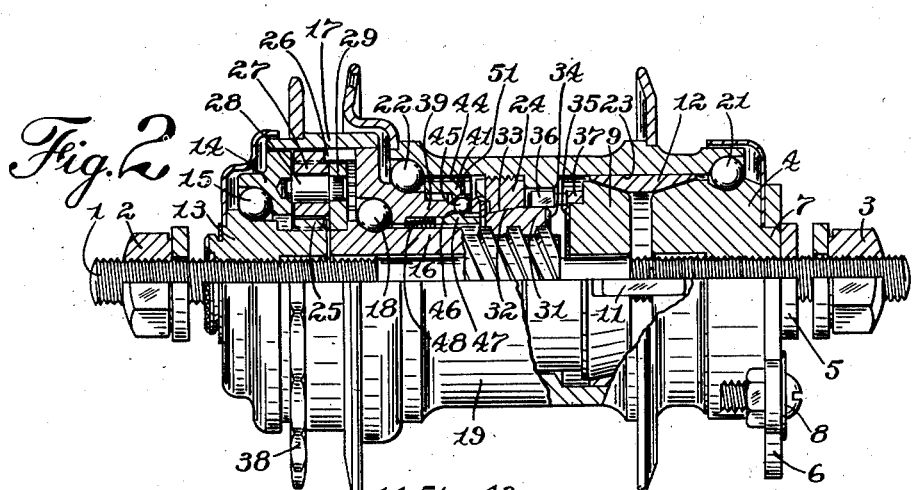
Fig. 2 is a similar view showing the reduction gearing in operation.

In operation, starting with the parts in high gear position as shown in Fig. 1, it will be seen that the high-speed driving clutch member 41 is meshed with the driven clutch member 24 and the low-speed driving clutch member 31 is held out of contact by engagement of the ball 45 with the rib 49 on collar 47. Supposing the vehicle to be in use, if the operator desires to shift into low gear it is merely necessary for him to stop pedaling for an instant whereby the rotation of the driving member 17 is arrested, and the hub 19 continues to rotate forwardly or "coast" which causes the high-speed driving clutch member 41 to be moved to the left as shown in Fig. 2 by the torque transmitted through the drag ring 44. When the operator then rotates the driving member 17 forwardly the low-speed driving clutch member 31 is traversed to the left into engagement with the driven clutch member 24 by the rotation of the screw shaft 16, such traversal being ensured by the friction of the stationary drag ring 36. Such movement is permitted by the ball 45 since at this time the ball is free to be moved radially outward by the cam rib 49 on collar 47, inasmuch as the high-speed driving clutch member 41 has been moved out of its path and is held out by the over-running of hub 19 while low-speed clutch member 31 is being traversed. Thereafter the hub is rotated at reduced speed through the planetary gearing 26, 27, 25, screw shaft 16 and clutch member 31.

When the operator wishes to shift back into high gear or direct drive, he again arrests the rotation of the driving member 17, and preferably rotates it backward slightly in order to move the low-speed driving clutch member 31 to the limit of its movement to the right. Resumption of pedaling by the operator then causes the high-speed driving clutch member 41 to engage with the driven clutch member 24, which takes place before the low-speed clutch member can move into operative position since the driving member and sleeve 39 rotates more rapidly than the screw shaft 16 and is formed with a thread of higher pitch as above stated.

It will be understood that the speed of rotation of the hub as related to the speed of rotation of the driving member when the selection of gear ratio is being made has a determining effect. For this reason the shift from low gear to high gear will normally be made rather abruptly in order to reduce the concurrent effect of the rotation of the hub. On the other hand the shift from high to low gear will be made in a somewhat more leisurely manner in order that the rotation of the hub will be sure to hold the high-speed driving clutch member 41 in its idle position.

When it is desired to apply the brake, backward pressure on the driving member 17 causes the low-speed driving clutch member 31 to be traversed to the right and engage the expander 9 forcing it toward the fixed expander 4 by screw-jack action, thus expanding the brake shoes 12 against the interior surface 23 of the hub 19 to retard the vehicle. It will be noted that in the braking action the torque for applying the brake is always transmitted through the planetary reduction gearing, thus utilizing the mechanical advantage of the gearing to reduce the force required to be exerted by the operator.

Although but one embodiment of the invention has been shown and described in detail it will be understood that changes may be made in the precise form and arrangement of the parts without departing from the spirit of the invention.

I claim:

1. In a two-speed coaster brake, a stationary axle, a screw shaft journaled thereon, a driving member including an oppositely threaded sleeve rotatably mounted on the screw shaft, a wheel hub rotatably supported on said driving member, gearing for rotating the screw shaft from the driving member, a driven clutch member fixed within the hub, a primary driving clutch member threaded on the screw shaft, and a second driving clutch member threaded on said sleeve; and means for selectively moving said driving clutch members into engagement with the driven clutch member by forward rotation of said driving member; in which said means for selectively engaging the driving clutch members includes means forming a light frictional connection between the first-mentioned driving clutch member and the axle, and means forming a light frictional connection between the second driving clutch member and the hub; and including further a latch member loosely mounted in a radial passage through said sleeve; a collar slidably mounted on the screw shaft in abutting relation to the first mentioned driving clutch member, having a cam surface engageable with the latch member to move it into position to prevent the second driving clutch member from moving into engagement with the driven clutch member when the first driving clutch member is so engaged.

2. A two-speed coaster brake as set forth in claim 1 in which the second driving clutch member is provided with means operative on the latch when the second clutch member engages the driven clutch member, to prevent clutch closing movement of the collar and first-mentioned driving clutch member.

3. In a two-speed coaster brake for velocipedes a stationary axle, an anchor-expander member fixed thereon, a movable expander slidably mounted on the axle, a plurality of brake shoes seated on said expander members, a screw shaft journaled on the axle adjacent the movable expander member, a driving member including a threaded sleeve of opposite hand to the screw shaft rotatably mounted thereon, a wheel hub journaled on said driving member and the anchor member and having an internal surface engageable by said brake shoes, a driven clutch member rigidly mounted in the interior of the hub, a high-speed driving clutch member so threaded on said sleeve that forward rotation of the sleeve with respect thereto moves its driving clutch member into engagement with the driven clutch member, means including reduction gearing connecting the sleeve to the screw shaft to rotate the latter in the same direction at a reduced speed, a low-speed driving clutch member so threaded on the screw shaft that forward rotation of the screw shaft with respect thereto moves it into engagement with the driven clutch member and backward rotation of the screw shaft moves the low-speed driving clutch member into engagement with the movable expander member, and means actuated by engaging movement of either driving clutch member for holding the other driving clutch member spaced from the driven clutch member.

4. A two-speed coaster brake as set forth in claim 3 in which said holding means comprises a blocking ball, and means whereby clutch-engaging movement of one driving clutch member moves the blocking ball into position to prevent engaging movement of the other driving clutch member.

5. In a two-speed coaster brake, a stationary axle, a screw shaft journaled thereon, a driving member including a threaded sleeve rotatably mounted on the screw shaft, a wheel hub rotatably supported on said driving member, gearing for rotating the screw shaft from the driving member, a driven clutch member fixed within the hub, a primary driving clutch member so threaded on the screw shaft that forward rotation of the screw shaft relative thereto causes said driving clutch member to approach the driven clutch member; a second driving clutch member so threaded on said sleeve that forward rotation of the sleeve relative thereto causes said second driving clutch member to move toward the driven clutch member, and means actuated by engaging movement of either of the driving clutch members for preventing the other from engaging the driven clutch member.

6. A two-speed coaster brake as set forth in claim 5 in which the means for alternatively preventing the driving clutch members from engaging the driven clutch member comprises a blocking ball member and means responsive to engaging movement of either driving clutch member for moving the blocking ball into position to prevent engagement of the other.

7. In a two-speed coaster brake a stationary axle, a screw shaft journaled thereon, a driving member including an oppositely threaded sleeve rotatably mounted on the screw shaft, a wheel hub rotatably supported on said driving member, gearing for rotating the screw shaft from the driving member, a driven clutch member fixed within the hub, a primary driving clutch member threaded on the screw shaft, and a second driving clutch member threaded on said sleeve; an element movable into position to block the engagement of either of the driving clutch members with the driven clutch member, and means whereby the engaging movement of one of the driving clutch members moves said element into position to prevent engagement of the other driving clutch member.

8. A two-speed coaster brake as set forth in claim 7 in which said blocking element is in the form of a latch member mounted in the threaded sleeve for radial movement into position to prevent engaging movement of one or the other of the driving clutch members.

References Cited in the file of this patent

UNITED STATES PATENTS

| | | |
|---|---|---|
| 564,617 | Harder | July 28, 1896 |
| 813,464 | Svenson | Feb. 27, 1906 |
| 813,465 | Svenson | Feb. 27, 1906 |
| 894,516 | Maynes | July 28, 1908 |
| 942,220 | Rockwell | Dec. 7, 1909 |